April 19, 1960 — H. DE W. ERASMUS ET AL — 2,933,297
LIME KILN
Filed Oct. 4, 1957 — 2 Sheets-Sheet 2

INVENTORS
Hendrik de Wet Erasmus
BY Hans Leuenberger

Herbert J. Evers
ATTORNEY

United States Patent Office 2,933,297
Patented Apr. 19, 1960

2,933,297

LIME KILN

Hendrik de W. Erasmus, Lewiston, and Hans Leuenberger, Niagara Falls, N.Y., assignors to Union Carbide Corporation, a corporation of New York Application October 4, 1957, Serial No. 688,815

5 Claims. (Cl. 263—30)

This invention relates to a vertical kiln for calcining limestone, and more particularly concerns a lime kiln having improved means for effecting even distribution of the heat therein.

The present practice of burning limestone is generally accomplished in either a rotary or vertical kiln. The rotary kiln is fairly effective, but this type of furnace is expensive to install, and in the calcining process considerably more fuel is necessary than in the vertical kiln. In the vertical type kiln a mixed feed of limestone and coke may be employed, but this method of burning limestone is effective only if the solid fuel is well distributed. A prime disadvantage of mixed feed kilns is that in many cases the residual ash from the coke becomes an objectionable part of the final product. In addition, coke may be a more expensive fuel than available gaseous or liquid fuels which have the additional advantages of low sulfur and no ash content.

In the past several attempts have been made to burn limestone in a vertical kiln using fluid fuels, such as combustible liquid or gaseous fuel mixtures. Such attempts have not been generally satisfactory, due to the high flame temperatures produced by the combustion of the fluid fuel.

One of the principal problems in fluid-fired kilns concerns the difficulty in obtaining uniform distribution and mixing of the air and fluid fuel in the calcination zone of the kiln. It frequently happens that combustion of fluid fuel mixtures may be more complete in one section of the kiln than in another. The result is that in some sections of the kiln the material to be treated is overheated and becomes fused, and forms into agglomerated masses known as "hangs," while in other sections of the kiln the limestone is only partially burnt in its downward travel, resulting in a high core content of unburnt limestone in the product.

In conventional vertical kilns, refractory ducts are generally used to introduce the fluid fuel as uniformly as possible throughout the cross section of the calcination zone. Being stationary, these refractory ducts tend to be heated to higher temperatures than the passing partially or completely burned lime, with the result that the lime tends to stick to the refractory structure, causing progressive build-up or hangs in the kiln. Such hangs disturb the uniformity of the flow of solids, which in turn results in poor average quality. Also, if not quickly removed, they cause severe damage to the refractory structure in the kiln. This is a frequent occurrence, since hangs are not easily detected inside the kiln.

It is, therefore, an important object of the present invention to provide an improved lime burning kiln, wherein the difficulty of maintaining and controlling the calcination temperature is to a large degree avoided, and wherein an even distribution of fuel and air throughout the calcination zone may be effected.

Another object is the provision of a network of conduits and ducts so constructed and arranged as to introduce combustible fuel mixtures and air into the calcining zone and to complete the combustion of said mixtures in several stages, thereby insuring the even distribution of heat throughout the calcining zone.

To the end that the above set forth difficulty may be resolved, the present invention contemplates an improved lime burning kiln, wherein water-cooled beams are employed instead of refractory ducts to introduce and distribute the fluid fuel in the kiln, and wherein the water-cooled beams are run horizontally through various portions of the kiln, over and around which the limestone and lime travel in their downward descent. This movement allows a V-shaped void (free of solid material) to form under each beam. The voids permit visual observance of the movement of the limestone clear across the entire kiln at several levels. Hangs can thus be easily detected, and the uniformity of the firing observed.

By measuring the temperature rise of the water used to cool the beam sections, the result can be correlated with the temperature of the charge. If the water temperature indicates excessive heat concentration inside a particular area of the kiln, remedial steps may be quickly taken to change and control the temperature of the charge so as to produce an adequately calcinated limestone without hangs.

According to the present invention, the burning of limestone and other materials may be carried out in a vertical kiln, using fluid combustible fuel, without encountering the prior art difficulties of uneven heat distribution resulting in unavoidable sintering or incomplete calcination of the limestone. The method of the invention generally consists in burning crushed limestone in a vertical kiln wherein combustible mixtures of fluid fuel and primary air are introduced and distributed throughout the entire cross section of the calcination zone in the kiln, using water-cooled beams as conduits to distribute the fuel mixtures. The heat of combustion of these fuel mixtures is disseminated in several stages by providing an amount of primary air insufficient for the complete combustion of the fuel, so that the temperatures of the primary combustion gases and combustible gases so produced at the lower end of the kiln are preferably within the desired temperature range of between 1300° C. and 1400° C. Secondary additions of air, introduced in an adjustable amounts near the lower end of the kiln and uniformly distributed across the kiln, are preheated by the hot descending lime product, and caused to mix with the aforesaid gases to provide secondary combustion reactions in the region of the kiln slightly above the region of primary combustion. By providing a quantity of secondary air greatly in excess of that required for burning the combustible gases, the temperature of secondary combustion can be confined to within the desired acceptable limits. Thereafter, because of the heat supplied by the rising gas products of combustion from below, at higher levels in the calcination zone, the primary air-fuel mixture may, if desired, be progressively diluted with recycled gas products of combustion, using an excess of fluid fuel so as to produce a primary and secondary combustion temperature substantially the same as the temperature below. In this manner an even distribution of heat throughout the entire calcination zone of the kiln may be obtained.

The invention also consists in a fluid fuel operated vertical kiln adapted to fulfill the aforesaid method, which comprises a hollow vertical shaft kiln having at the top suitable accessories for introducing the limestone material to be treated and for removing the gas products of combustion, and chutes at the bottom of the kiln for cooling and removing lime product and means for uniformly admitting secondary air across the lower end of the kiln for preheating the secondary air by contact with the emerging lime product. A plurality of horizontal water-cooled beams, vertically and horizontally spaced from each other and disposed in staggered relation through the calcination zone, constitute feed ducts for distributing the primary air-fuel mixtures to effect a substantially uniform temperature of calcination in accordance with the principles of the invention. The ducts further provide novel means for visually inspecting the progress of calcination inside the kiln.

The invention is illustrated by way of example only in the accompanying drawing in which.

Figure 1:
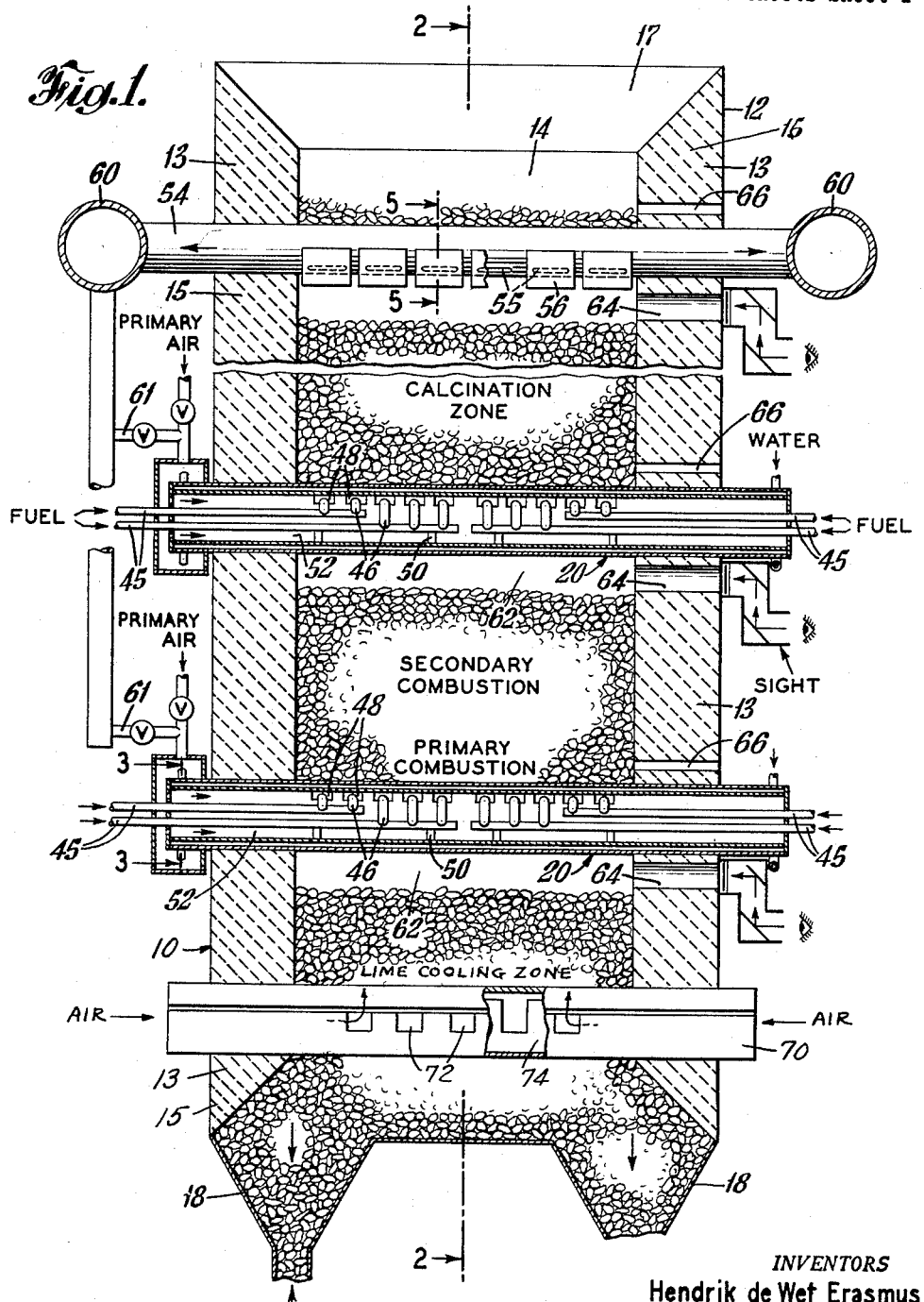
Figure 1 is a sectional elevational view illustrating the principles and features of the present invention.

Shown in Figure 1 is a lime-burning kiln 10 embodying the principles of the present invention, and comprising a vertical shaft 12 of rectangular cross section provided with end walls 13, 14 and a refractory lining 15, 16 therefor, and having conventional charging chutes 17 at the top of the kiln for the introduction of the material to be treated. Discharge chutes 18 at the bottom of the kiln 10 permit the removal of lime product, provision being made for the passage of secondary air upwardly into the kiln shaft in order to simultaneously preheat the air and cool the emerging lime product. The secondary air may be introduced either upwardly through the chutes 18 or preferably by means of a transverse orificed air duct or tubes 70, to be described hereinafter.

In accordance with the invention, novel means of tempering the gases of combustion in the calcining zone make possible the calcination of limestone and other materials under carefully controlled temperature conditions. For the accomplishment of this purpose there is provided a plurality of high strength structural beams 20, made of steel or other temperature-resistant material extending horizontally across the calcining zone, and supported at opposite ends by the end walls 13—13, the beams extending outwardly beyond said walls. These beams are vertically and horizontally spaced from each other, and disposed in staggered relation in order to provide channels affording maximum distribution of the fuel mixture in the kiln. Any number and arrangement of beams may be employed in the practice of the invention, five beams disposed in staggered arrangement and in two rows at different levels, no beam being vertically aligned with another beam, being shown and illustrated herein.

Each of the beams 20 is preferably a wide flange beam having a vertical web 22 provided with laterally extending upper flanges 23, 24 and lower flanges 25, 26. The ends of the flanges 23, 24, carry short extension members or lips 23a, 24a, which project laterally from the underside of the flanges, and slightly beyond the lateral extremities thereof. Similar flange members 25a, 26a, joined to the topside of flanges 25, 26, terminate flush with the lateral ends of their respective flanges. Welded to the flange members 23a, 24a, 25a and 26a, and to the central web 22, are rectangular duct plates 23b, 24b, 25b and 26b, respectively, to form therewith longitudinal, rectangularly cross sectioned, cooling ducts 28, 29, 30 and 31 for cooling the beam 20. Side walls 33 and 34 connect the lateral extremities of the duct plates to form longitudinal passageways 35 and 36 for conducting gases into the kiln. These side walls 33 and 34 may be provided with longitudinal, cooling ducts 38, 39, 40 and 41, similar to ducts 28, 29, 30 and 31. Cooling water may be passed in series through these ducts by water tight connectors or loops 43 between adjacent ends of the longitudinal ducts to provide a continuous serpentine path for the circulation of water therethrough. Thus, cooling water supplied to duct 28 passes sequentially through ducts 38, 39, 30, 31, 41, 40 and leaves through duct 29. A comparison of the entering and exit temperatures of the cooling water gives a fair indication of the temperature conditions inside the kiln, and is an excellent and convenient means for ascertaining the uniformity of the temperature in a number of regions inside the kiln. The connectors 43 may be made detachable so that individual beam units may be conveniently withdrawn for repair or replacement.

Calcination is accomplished by means of combustible fuel mixtures which are drawn into direct contact with the material in the calcination zone through one or more combustible fuel lines or pipes 45 having longitudinally spaced and laterally extending outlet ports 46. The exiting fuel from the fuel outlets 46 enters the calcination zone through slotted openings 48 in the side walls 33, 34, the total cross section of these openings being less than or equal to 60 percent of the total cross sectional area of the passageways 35, 36, not occupied by the fuel lines 45. Any suitable number and arrangement of fuel lines 45, outlets 46 and slotted openings 48 may be used, the lines 45 being shown and illustrated herein in vertically spaced tiers in each passageway, and supportingly held therein by pipe supports 50. As here illustrated in Figure 1, the fuel lines 45 may be blind end pipes disposed in duplicate pairs in each passageway, each pair being adapted to introduce combustible fluid fuel at spaced intervals as far as the center of the calcination zone of the kiln. The openings 48 are shown in registry with the outlets 46, but obviously other and different arrangements may be equally as feasible.

Figure 3:
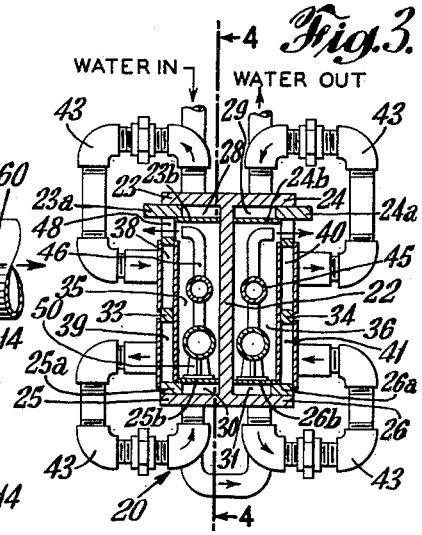
Figure 3 is an enlarged sectional view of the water cooled, gas dispensing beam employed in the present invention, taken along the line 3—3 in Figure 1.
Figure 4:
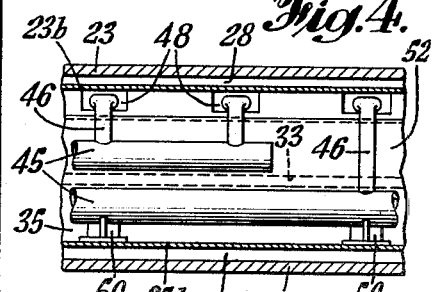
Figure 4 is a sectional view taken along line 4—4 in Figure 3.

It should be noted that in the specific construction illustrated in Figure 3, there is a possibility of obstructing the openings 48 with limestone and thereby impairing the functioning of the fuel distribution system of the invention. To avoid this possibility, each of the lips 23a, 24a should have enough of an overhang to provide a sufficient angle of repose so that freely flowing streams of combustible fuel mixtures through the openings 48 are assured at all times.

Control of the combustion temperature of the ejected fuel in pipes 45 is achieved in the present invention by utilizing the space within the passageways 35, 36 not occupied by the fuel lines 45 as additional conduits 52 for the admission of either air or diluent gases such as recycled products of combustion. These conduits 52 may be compartmentalized if so desired to avoid mixing of the fluids admitted from opposite ends of the beam 20, thereby further ensuring even distribution of the fuel. Inasmuch as complete combustion of the fuel in the line 45 will result in temperatures greatly in excess of 1400° C., the fluids in fuel line 45 and conduits 52 may be admitted into the calcination zone through the slotted openings 48 in such proportions as to limit the amount of primary oxygen that is made available to the fuel, so that combustion of the fuel mixture may be distributed into several stages of combustion. For this purpose the fuel mixture admitted into the lowermost level of the calcining zone may comprise an excess of fluid fuel with sufficient oxygen-bearing gases to give a flame temperature of about 1400° C. in the immediate vicinity of the lower beams. The fluid fuel which is only partially burnt due to the controlled oxygen deficiency in this primary stage of combustion, is then available for admixture and secondary combustion with the ascending preheated air from secondary air tubes 70. The additional flame brought about by secondary combustion will produce only a moderate rise in temperature, due to the limited concentration of combustible gas in this partially burnt fuel.

In the meantime, primary combustion of excess fuel and oxygen-bearing gas at the upper beam level also produces a temperature of approximately 1400° C., thereby making available additional partially burnt fuel for the remaining oxygen in the ascending preheated air.

Excessive temperature rise at this upper level is further inhibited due to the limited amount of remaining oxygen in the ascending preheated air, and also because of the dilution of this preheated air with the products of combustion from the lower combustion level. As a consequence, the combustible fuel mixtures obtained from lines 45 and conduits 52 are controllably released in several stages of combustion, so that at no point in the calcination zone is an excessive temperature condition encountered.

Figure 2:
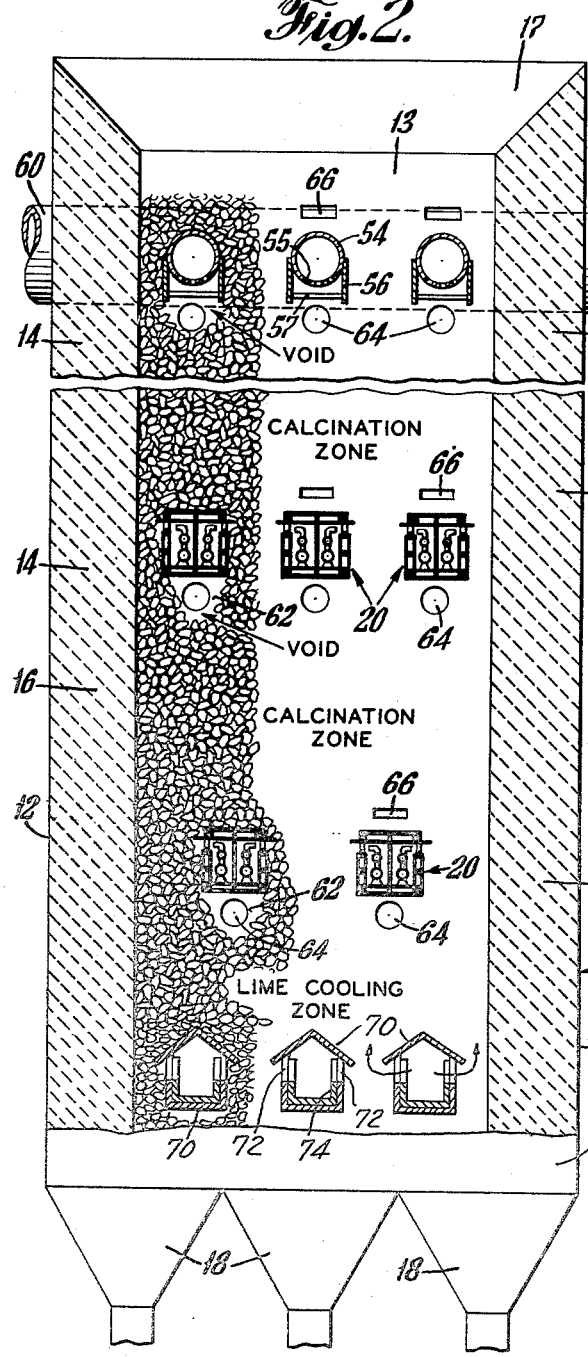
Figure 2 is a sectional view of the apparatus shown in Figure 1 taken along the line 2—2.

It should be understood that although the burning process as described hereinabove has been simplified for purposes of expansion and illustration, the fuel mixtures may be burned in any number of stages, or may be only partially burned if so desired. As a practical matter, the fuel should be burned to completion by the time it reaches the top of the calcining zone, which in the present instance extends up to the break line shown in Figures 1 and 2, for only in this manner can the kiln be expected to operate with maximum efficiency and economy.

Prior to the admission of the fluids in fuel line 45 and conduits 52 into the calcination zone, it is essential that these fluids be cleansed of impurities to prevent the choking and clogging of the fuel distribution system. For this purpose, the fuel and/or air and/or recycled products of combustion may be thoroughly cleansed in a Venturi type scrubber, for example, a Pease-Anthony Scrubber. Fluids cleaned in this manner and employed in the practice of the invention are clear and colorless. In actual analyses of 100 cu. ft. samples of these purified fluids, weighable amounts of impurities could not be detected.

An obvious advantage of the water-cooled beams 20 is that they afford novel means for visually inspecting the calcination zone of the kiln from a vantage point outside the kiln. The square cross section of the beams 20 allows a V-shaped void 62 which runs horizontally across the kiln, to be formed directly below the beam. Through sight holes or windows 64 disposed in the walls 13 in registry with the voids 62, preliminary signs indicating the formation of incipient encrustations, such as the flame coloring of the kiln charge, may be observed at several levels across the entire kiln without interference from supporting columns. Hangs can thus be easily detected, and the uniformity of the firing observed.

When the formation of a hang is detected, the mass of accumulated limestone may be broken up into smaller pieces and made to move along with the limestone charge by means of probing tools (not shown), such as stoker bars, pneumatic drifter drills or other power devices. The probe tool may be loosely inserted in an elongated probe hole 66 in the end wall 13 slightly above the beam 20, and manipulated in an arc along the top of the beam flanges 23, 24, so as to disintegrate the hang and to free the beam of any encrustations which might serve as nuclei for future hangs. By the use of drifter drills, it is possible to efficiently operate kilns of much larger cross section than heretofore.

Figure 5:
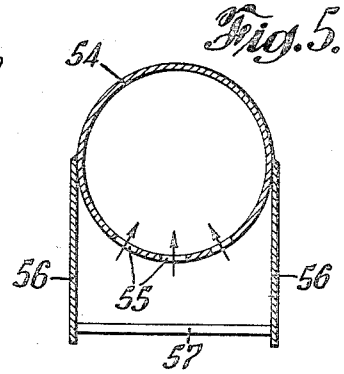
Figure 5 is an enlarged sectional view of the off-take pipe taken along line 5—5 in Figure 1.

To remove the gases of combustion, the upper portion of the shaft 12 may be provided with one or more suitably formed off-take tubes or pipes, such as inverted trough-like conduits and preferably in the form of cylindrical off-take pipes 54 horizontally spanning the shaft 12, and extending outwardly beyond the walls 13—13. As illustrated here in Figure 5, suitable apertures 55 in the lower halves of the pipes 54 serve as inlets for admitting gas from the upper end of the shaft.

As a feature of the invention, the efficiency of the exhaust gas removal from the kiln is considerably enhanced by the attachment of skirts or side plates 56, tangentially secured in pairs to opposite sides of the off-take pipes 54, and depending therefrom. Since the pressure of the limestone moving downward might tend to fold these skirts inward, brace bars 57 secured to the lower ends of each pair of plates 56 are employed to hold them separated and in a vertical position. The skirt attachments thus permit a larger area from which the gas may be withdrawn through the apertures 55. A substantial reduction is thus made in the exhaust gas velocity from the bed of limestone.

With the above arrangement the offtake pipes 54 eliminate the exhaust gases by suction through a suction blower (not shown) in a manifold 60. A portion of the combustion products in the manifold 60 may be recycled to a lower portion of the calcination zone, or into the passageways 35, 36 in the beams 20 through a valve-controlled, return line 61 to further control and modify the flame temperature inside the calcination zone.

In the event the exhaust gases are to be recycled, suitable dust-removal equipment of the type discussed hereinabove should, of course, be provided to remove the entrained dust.

As previously mentioned, a further feature of the invention resides in the employment of multiple air tubes 70 horizontally mounted across the kiln in a manner similar to beams 20 and disposed slightly above the discharge chutes 18. The air tubes are connected to a source of air (not shown) and are provided with a series of horizontally spaced apertures 72 for supplying secondary air to the kiln. A slide 74 disposed inside the tube 70 and having apertures in registry with the apertures 72 serves to adjustably control the size of the aperture openings 72. In this manner an adjustable and uniform distribution of secondary air across the kiln may be effected.

By way of amplifying the above procedure, the following example illustrates again the multi-stage combustion progress in the lime kiln of the present invention. At the lower level of beams 20, enough excess carbon monoxide furnace gas may be mixed with air-bearing products of combustion containing about 14% oxygen through the mixing ducts 45 and 52, to give a flame temperature of about 1400° C., and produce first stage products of combustion containing about 10% carbon monoxide. When this mixes with the preheated air supplied by air tubes 70 and travelling up the kiln, the additional flame resulting from secondary combustion will only be about 500° hotter than the preheated air. If the volumes of preheated air and first stage products of combustion are equal, then the second stage products of combustion will contain approximately 8.2 percent oxygen. At the upper level, a mixture of air and recycled combustion products containing about 16% oxygen may also be burned with furnace gas to give first stage products of combustion containing 16 percent carbon monoxide and a flame temperature of approximately 1400° C. When these first stage products of combustion from the upper beam level mix and react with the ascending second stage products of combustion from the lower beam level containing 8.2 percent oxygen, the maximum temperature rise will again be less than 500° C. above the surrounding limestone.

To indicate the practicability of the invention, a kiln constructed according to the prior art for an output of ¾ ton per square foot of kiln cross section per day was converted into one having the water cooled, fuel distributing beams and secondary air tubes of the invention, the converted kiln having a forced draft of approximately 1.0 p.s.i. Results of a number of tests showed a distinct improvement in kiln efficiency and lime quality, the output of the converted kiln averaging approximately three tons per square foot of kiln cross section per day. In other applications of the teachings of the invention, lime withdrawal rates as high as approximately four tons per square foot per day have been obtained compared to the standard withdrawal rate of approximately two tons per square foot per day.

From the above disclosure it will be seen that the beams serve as excellent devices for the equal dispersion of fluid fuel mixtures throughout the calcination zone of the kiln. Any alteration in the amount of oxygen-bearing gas or fuel to affect the flame temperature may be easily made. As a result, the surfaces of the beams are exposed to temperatures of a magnitude at which reaction with the material in the kiln would normally be possible. However, this objectionable possibility is offset by the water-cooling inside the surfaces of each of the beams.

Although the construction of the kiln makes possible the use of limestone as the charge with a fluid fuel, it is to be understood that it need not be so limited, since the flexibility of operation of the kiln of the present invention permits the substitution of coke for any portion of the fuel. In the event of such substitution, the coke could be initmately mixed with the limestone, and thus the coke-to-fuel ratio could be proportioned to any degree, its use being dependent only upon the availability and economics of the material in the area of use. Furthermore, the operation of the kiln of the present invention is not necessarily limited to the calcination of limestone. Other calcining operations such as that performed on dolomite may be carried out in the kiln of the present invention in accordance with the principles thereof, if so desired.

By fluid fuel as defined hereinabove is meant either a gas such as carbon monoxide, or any number of fluids which are commonly employed in a fuel capacity, such as conventional oil and gas fuels.

It will be understood that modifications and variations may be effected without departing from the spirit and scope of the novel concepts of the present invention.

This application is a continuation-in-part of our co-pending application, S.N. 551,600, filed December 7, 1955, now abandoned.

What is claimed is:

1. A kiln for the production of lime from limestone comprising a vertical shaft having a feed zone in the upper portion thereof through which a charge is introduced for passage downwardly through the shaft, a calcining zone in said shaft below the feed zone and in which said charge is heated to form lime, and a cooling zone in the lower portion of the shaft below said calcining zone for receiving product from said calcining zone and from which said product is discharged from said shaft, means for introducing air into the lower end of the shaft to rise successively through at least the cooling zone and the calcining zone so as to cool the product and at the same time preheat the air before it passes into the calcining zone, a plurality of horizontal hollow beam members extending across the calcining zone, each having oppositely disposed lateral openings along the length of the beam, means within the beam for delivering a mixture of fuel and primary combustion air, in a proportion in which said air is less than that required for complete combustion, to said lateral openings for discharge therethrough in substantially uniform distribution along the length of the beam, whereby primary partial combustion of the fuel and combustion air supplied through the hollow beam members occurs in the vicinity of the beams and the unburned portion of fuel supplied therethrough is consumed by contact with the preheated air rising through the charge to evenly distribute heat throughout the calcining zone.

2. A kiln for the production of lime from limestone comprising a vertical shaft having a feed zone in the upper portion thereof through which a charge is introduced for passage downwardly through the shaft, a calcining zone in said shaft below the feed zone and in which said charge is heated to form lime, and a cooling zone in the lower portion of the shaft below said calcining zone for receiving product from said calcining zone and from which said product is discharged from said shaft, means for introducing air into the lower end of the shaft to rise successively through at least the cooling zone and the calcining zone so as to cool the product and at the same time preheat the air before it passes into the calcining zone, a plurality of horizontal hollow beam members extending across the calcining zone, each having oppositely disposed lateral openings along the length of the beam, fluid fuel conduits and primary combustion air conduits located within said beams, said conduits having outlets positioned to discharge fuel and air mixtures through said openings in substantially uniform amounts along the length of the beam.

3. A kiln for the production of lime from limestone comprising a vertical shaft having a feed zone in the upper portion thereof through which a charge is introduced for passage downwardly through the shaft, a calcining zone in said shaft below the feed zone and in which said charge is heated to form lime, and a cooling zone in the lower portion of the shaft below said calcining zone for receiving product from said calcining zone and from which said product is discharged from said shaft, means for introducing air into the lower end of the shaft to rise successively through at least the cooling zone and the calcining zone so as to cool the product and at the same time preheat the air before it passes into the calcining zone, a plurality of horizontal hollow beam members extending across the calcining zone, each having oppositely disposed lateral openings along the length of the beam, fluid fuel conduits and primary combustion air conduits located within said beams, said conduits having outlets positioned to discharge fuel and air mixtures through said openings in substantially uniform amounts along the length of the beam, said hollow beam members having a plurality of longitudinally extending ducts for the circulation therethrough of cooling water.

4. A kiln for the production of lime from limestone comprising a vertical shaft having a feed zone in the upper portion thereof through which a charge is introduced for passage downwardly through the shaft, a calcining zone in said shaft below the feed zone and in which said charge is heated to form lime, and a cooling zone in the lower portion of the shaft below said calcining zone for receiving product from said calcining zone and from which said product is discharged from said shaft, means for introducing air into the lower end of the shaft to rise successively through at least the cooling zone and the calcining zone so as to cool the product and at the same time preheat the air before it passes into the calcining zone, a plurality of horizontal hollow beam members extending across the calcining zone in at least two horizontal rows, said members being spaced in said rows in a staggered relation to distribute fluid fuel throughout the cross section of the calcining zone of said shaft, each beam member having oppositely disposed lateral openings along the length of the beams communicating with the interior of said beams, a plurality of combustible fluid fuel conduits in said beam, each conduit extending to different positions along the length of the beam for providing uniform delivery of said fluid fuel along the length of the beam, said fuel conduits having outlets positioned to discharge through said openings, the remaining space in said hollow beam constituting a conduit for the flow of primary combustion air into said lateral openings for discharge therethrough in substantially uniform amounts along the length of the beam, said hollow beam members having a plurality of longitudinally extending ducts for the circulation therethrough of cooling water.

5. A vertical kiln for the production of lime, comprising a hollow shaft having a calcining zone, a plurality of channels across said shaft and within the calcining zone, each of said channels comprising a vertical web portion having at the upper and lower end thereof a pair of laterally outwardly extending flanges, a pair of laterally spaced side walls on opposite sides of said web and connected to the outer portions of said flanges to form a pair of longitudinal passageways straddling said web, each passageway having therein a pair of longitudinal ducts disposed respectively adjacent said upper and lower flanges, and a pair of longitudinal ducts disposed adjacent the side wall thereof, a connection between adjacent ends of said longitudinal ducts to provide a continuous serpentine path for the circulation of cooling water through said ducts, a plurality of openings in each of said passageways communicating with the interior of said shaft, a plurality of combustible fluid fuel lines in each of said passageways, said fuel lines having outlet portions in the vicinity of said openings respectively, the space in each of said passageways around said fuel lines constituting a conduit for the flow of oxygen-bearing diluent gases into the interior of said shaft through said passageway openings for controlling the heat of combustion resulting from the mixture therewith of the fuel from said fuel lines.

References Cited in the file of this patent

UNITED STATES PATENTS

| | | |
|---|---|---|
| 43,140 | Stetefeldt | June 14, 1864 |
| 2,108,118 | Greenawalt | Feb. 15, 1938 |
| 2,409,527 | Azbe | Oct. 15, 1946 |
| 2,446,805 | Bergstrom | Aug. 10, 1948 |
| 2,784,956 | Vogel | Mar. 12, 1957 |

FOREIGN PATENTS

| | | |
|---|---|---|
| 828,944 | France | June 3, 1938 |